(12) United States Patent
Bieron et al.

(10) Patent No.: US 12,243,108 B1
(45) Date of Patent: Mar. 4, 2025

(54) SYSTEM AND METHOD FOR PROVIDING FINANCIAL VALUATIONS OF ENTITIES

(71) Applicants: Brandon M. Bieron, Amherst, NY (US); Ryan T. Dobos, East Amherst, NY (US); Jonathan Kolozsvary, Fairport, NY (US); Gavin P. Musynske, East Amherst, NY (US)

(72) Inventors: Brandon M. Bieron, Amherst, NY (US); Ryan T. Dobos, East Amherst, NY (US); Jonathan Kolozsvary, Fairport, NY (US); Gavin P. Musynske, East Amherst, NY (US)

(73) Assignee: Manufacturers and Traders Trust Company, Buffalo, NY (US)

( * ) Notice: Subject to any disclaimer, the term of this patent is extended or adjusted under 35 U.S.C. 154(b) by 95 days.

(21) Appl. No.: 17/878,028

(22) Filed: Jul. 31, 2022

Related U.S. Application Data

(60) Provisional application No. 63/228,072, filed on Jul. 31, 2021.

(51) Int. Cl.
*G06Q 40/12* (2023.01)

(52) U.S. Cl.
CPC .................... *G06Q 40/12* (2013.12)

(58) Field of Classification Search
None
See application file for complete search history.

(56) References Cited

U.S. PATENT DOCUMENTS

| | | | |
|---|---|---|---|
| 6,393,406 B1 * | 5/2002 | Eder | G06Q 10/0639 705/7.38 |
| 8,468,075 B2 | 6/2013 | Carter | |
| 8,521,655 B2 | 8/2013 | Carter | |
| 8,606,664 B2 * | 12/2013 | Carter | G06Q 40/00 705/30 |
| 8,630,884 B2 | 1/2014 | Carter | |
| 8,666,851 B2 | 3/2014 | Carter | |
| 8,799,040 B2 | 8/2014 | Carter | |
| 2001/0034686 A1 * | 10/2001 | Eder | G06Q 40/02 705/36 R |
| 2001/0041996 A1 * | 11/2001 | Eder | G06Q 10/06 705/7.29 |
| 2002/0046143 A1 * | 4/2002 | Eder | G06Q 10/06 705/7.31 |
| 2012/0310795 A1 * | 12/2012 | Carter | G06Q 10/067 705/30 |
| 2012/0310806 A1 * | 12/2012 | Carter | G06Q 40/06 705/35 |
| 2020/0293961 A1 * | 9/2020 | Younger | G06Q 10/06393 |
| 2022/0076344 A1 * | 3/2022 | Bailey | H04L 51/18 |

* cited by examiner

*Primary Examiner* — Fateh M Obaid

(57) ABSTRACT

A method for determining a financial valuation for a business including: receiving a set of user inputs having at least one of the following: a total income, a cost of sales, a total expense, a depreciation, an amortization, a shared-based compensation, an owner compensation, a cash and marketable security, and a long term debt; receiving a set of fixed inputs having at least one of the following: a discount rate, and a tax rate; calculating at least one financial valuation using a modified discounted cash flow valuation method; determining when a trigger condition has been met based on the at least one financial valuation; when the trigger condition has been met, sending a business owner a recommendation to take a subsequent action.

8 Claims, 5 Drawing Sheets

SYSTEM AND METHOD FOR PROVIDING FINANCIAL VALUATIONS OF ENTITIES

CROSS REFERENCE TO RELATED APPLICATIONS

This application claims the benefit of U.S. Provisional Application Ser. No. 63/228,072 filed Jul. 31, 2021, which application is incorporated by reference herein in its entirety.

TECHNICAL FIELD

The presently disclosed embodiments are directed to providing financial valuations for entities, and more specifically, providing financial valuations for businesses of varying sizes, and even more particularly to providing financial valuations for businesses of varying sizes and using such valuations to predict an optimum time to offer a business for sale, to seek further investment in the business, or to take further actions to improve the condition of the business.

BACKGROUND

There are millions of businesses throughout the United States as well as globally. Small businesses face particular challenges that other larger businesses do not share. For example, small business owners may have difficulty in assessing the financial value of the business itself. The financial value can be important when a business owner is looking to sell her business, seek financial loans to support her business, etc. Small business owners do not typically understand the financial value of their business, or how to obtain an accurate valuation. When it comes to managing the day to day operations, as well as preparing for life events, business owners are often unaware about how much their business is worth. Business owners look for insight from the financial valuation, but also education on how that number is achieved.

Means of estimating small business financial value have proven difficult as many factors may be considered in the process. Additionally, small business owners are often experts in their respective business ventures, however, they may not have the specialized knowledge to calculate a financial value. Financial valuation professionals have a variety of means they have developed; however, such means are typically beyond the capabilities of small business owners, proprietary, etc.

Thus, there is a need for a small business valuation means that is accurate and readily usable by business owners who lack the specialized knowledge necessary to perform the valuation, where such valuation further indicates what future actions are practical and recommended. The present disclosure addresses a system and method for providing financial valuations for entities of various sizes and subsequent recommended actions.

SUMMARY

Broadly, the systems and methods discussed infra provide financial valuations for entities, e.g., small and medium sized businesses, thereby generating a variety of further options and in some embodiments automatically triggering subsequent events.

The present method broadly includes a method for determining a financial valuation for a business including: receiving a set of user inputs having at least one of the following: a total income, a cost of sales, a total expense, a depreciation, an amortization, a shared-based compensation, an owner compensation, a cash and marketable security, and a long term debt; receiving a set of fixed inputs having at least one of the following: a discount rate, and a tax rate; calculating at least one financial valuation using a modified discounted cash flow valuation method; determining when a trigger condition has been met based on the at least one financial valuation; when the trigger condition has been met, sending the business owner a recommendation to take a subsequent action.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
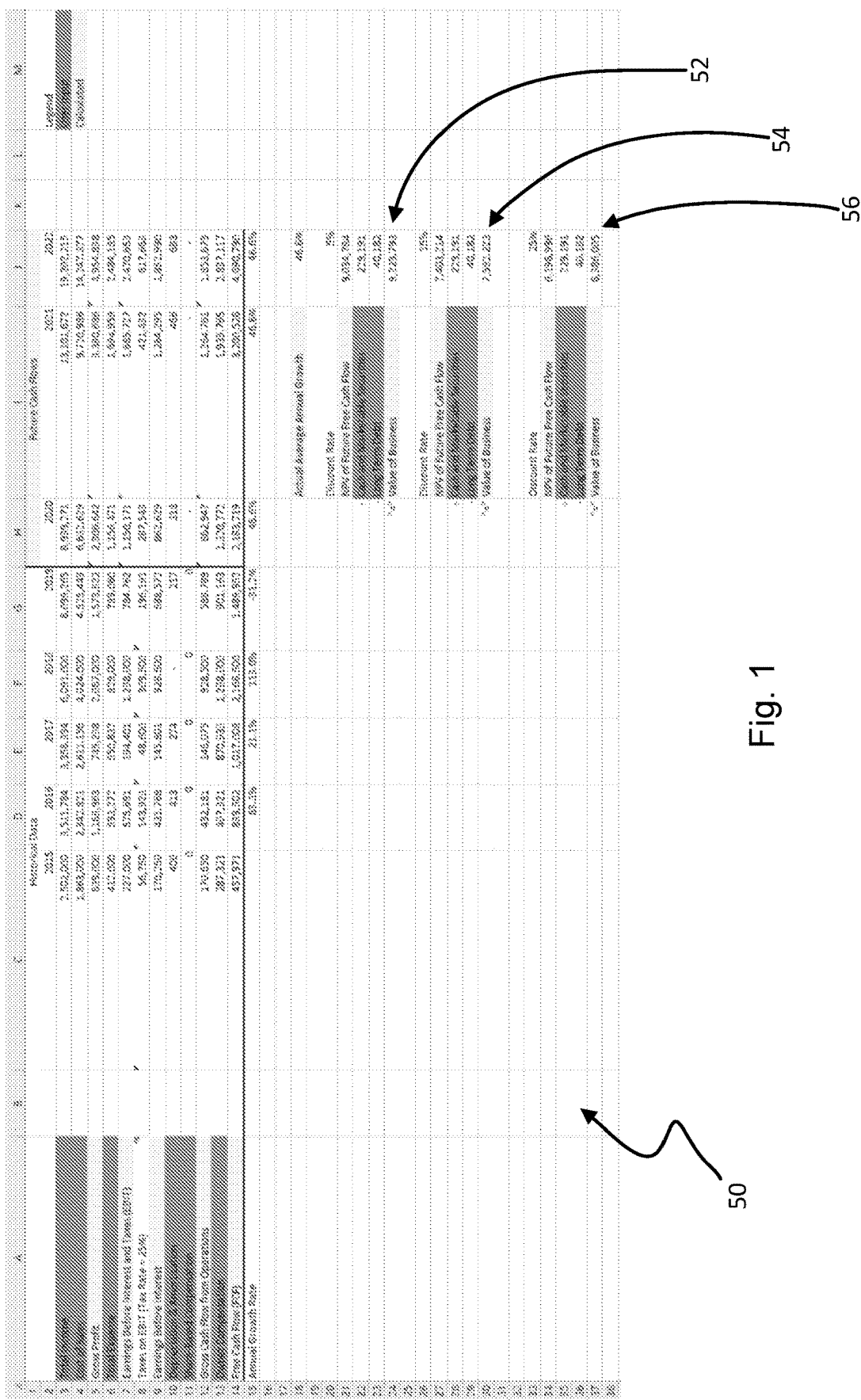
FIG. 1 is an embodiment of a present system for providing financial valuation of entities.

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong.

As used herein, the term 'average' shall be construed broadly to include any calculation in which a result datum or decision is obtained based on a plurality of input data, which can include but is not limited to, weighted averages, yes or no decisions based on rolling inputs, etc. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

The present systems and methods are designed to remove complexity from the process of determining a financial valuation for a small business entity, and when subsequent actions can be triggered by such a valuation. However, at the onset, it should be appreciated that the present systems and methods described herein may also be used to determine financial valuations for larger businesses, and other entities having analogous considerations when determining financial value, e.g., a multi-unit rental property. As such, the present systems and methods are designed to be usable on a generic computer without the need for specialized programming skills. For example, one embodiment described herein was built entirely within a computer spreadsheet software.

All financial valuation systems and methods begin with data, in particular data about the entity to be evaluated. As the present systems and methods are directed to determining financial valuations and steps thereafter, the data determined to be most critical is financial data. Table 1 herebelow summarizes the financial data determined to be most relevant to valuation calculations of the presently disclosed types.

TABLE 1

| Variable Name | Description |
| --- | --- |
| Total Income | Total annual income of the business. For purposes of financial valuation, 3-5 years of data was found to be mostappropriate. |
| Cost of Sales | The cost required to manufacture or purchase a product that is in turn sold to a subsequent party. |
| Total Expense | The amount of a business' expenditures before its net income. |
| Depreciation | A reduction in the value of an asset with the passage of time. |
| Amortization | Periodically lowering the listed value of a loan or intangibleasset over a set period of time. Amortization of an asset issimilar in concept to depreciation. |
| Share-Based Compensation | Compensation in the form of equity ownership rights, e.g.,stock options and restricted stocks. |
| Owner Compensation | Compensation paid to the owner or founder of the business. |
| Cash and Marketable | Cash and any unrestricted financial instrument that can be bought or sold on a public stock or |

TABLE 1-continued

| Variable Name | Description |
| --- | --- |
| Securities | bond exchange. |
| Long Term Debt | Debt that matures in more than one year. |

The foregoing data can be obtained directly from business owners, their accountants, accounting software packages, e.g., QuickBooks®, or data aggregators that amalgamate data from a variety of sources, such as software packages, for convenient querying, e.g., Railz®. It should be appreciated that some values may not be present or may not be used in the determination of a particular valuation, e.g., Depreciation, Amortization, Cash and Marketable Securities, and Long Term Debt. In those instances, such variables are set to a value of zero (0).

In addition to input obtained from parties related to the entity being evaluated, several variables are either fixed values or chosen by a user of the present systems and methods. Table 2 herebelow summarizes the fixed or chosen variables determined to be most relevant to valuation calculations of the presently disclosed types.

TABLE 2

| Variable Name | Description |
| --- | --- |
| Discount Rate | The interest rate used in discounted cash flow analysis to determine the present value of future cash flows. |
| Tax Rate | The interest rate used to determine the mandatory contributions levied on individuals or corporations by a government entity. |

As shown in the example embodiment infra, the present financial valuation methods may use a variety of Discount Rates in order to compare various valuation outcomes based on different assumptions, e.g., different assessments of the time value of money. In other terms, the Discount Rate provides a means to account for risk, with the lower Discount Rates resulting in a higher financial valuation. Depending on the user's risk tolerance, an artificially low Discount Rate could result in an over estimated financial valuation.

From the user input variables described above in Table 1 and the fixed variables described above in Table 2, a number of intermediate and final values/variables are obtained by performing calculations, in order to determination a financial valuation of a business. Table 3 herebelow summarizes the intermediate and final calculated values/variables used to progress from known characteristics related to a business to accurate financial valuations.

TABLE 3

| Variable Name | Description |
| --- | --- |
| Gross Profit | The profit a company makes after deducting the costs associated with making and selling its products or providing its services. |
| Earnings Before Interest and Taxes (EBIT) | An indicator of a company's profitability. |
| Taxes | Mandatory contributions levied on individuals or corporations by a government entity. |
| Earnings Before Interest | An indicator of a company's profitability. |
| Gross Cash Flow from Operations | The cash generated by the business' operation. |
| Historical Free Cash Flow (FCF) | Historical data showing cash flow available for the business to repay creditors or pay dividends and interest to investors. |
| Annual Growth Rate | Change in value of an asset over one year, e.g., the business. |

TABLE 3-continued

| Variable Name | Description |
| --- | --- |
| Average Annual Growth Rate | Change in value of an asset determined by averaging at least two prior annual growth rates. |
| Future FCF | Predicted future data showing cash flow available for the business to repay creditors or pay dividends and interest to investors. |
| Net Present Value (NPV) FCF | The difference between the present value of cash inflows and the present value of cash outflows over a period of time. |
| Value of Business | The resultant financial valuation obtained from the present system and method. |

The following equations are used to calculate the values described in Table 3 above.

$$\text{Gross Profit} = (\text{Total Income}) - (\text{Cost of Sales}) \qquad (1)$$

$$\text{EBIT} = (\text{Gross Profit}) - (\text{Total Expense}) \qquad (2)$$

$$\text{Taxes} = (\text{EBIT}) \times (\text{Tax Rate}) \qquad (3)$$

$$\text{Earnings Before Interest} = (\text{EBIT}) - (\text{Taxes}) \qquad (4)$$

$$\text{Gross Cash Flow from Operations} = (\text{Earnings Before Interest}) + (\text{Depreciation}) + (\text{Amortization}) + (\text{Share-Based Compensation}) \qquad (5)$$

$$\text{Historical Free Cash Flow} = (\text{Gross Cash Flow from Operations}) + (\text{Owner Compensation}) \qquad (6)$$

$$\text{Annual Growth Rate} = [(\text{Free Cash Flow}_{year\ n+1}) + (\text{Free Cash Flow}_{year\ n})]/(\text{Free Cash Flow}_{year\ n+1}) \qquad (7)$$

$$\text{Average Annual Growth Rate} = [(\text{Annual Growth Rate}_{year\ n}) + (\text{Annual Growth Rate}_{year\ n+1}) + (\text{Annual Growth Rate}_{year\ n+2})]/(3) \qquad (8)$$

$$\text{Future Free Cash Flow} = (\text{Historical Free Cash Flow}) \times (1 + \text{Average Annual Growth Rate}) \qquad (9)$$

$$\text{Net Present Value Free Cash Flow} = \sum_{i=1}^{n} \frac{\text{values}_i}{(1 + \text{rate})^i} \qquad (10)$$

Where n=the number of data points included, e.g., 3 years
values=Free Cash Flow for a particular year
rate=Discount Rate $$\text{Value of Business} = (\text{Net Present Value Free Cash Flow}) + (\text{Cash and Marketable Securities}) - (\text{Long Term Debt}) \qquad (11)$$

It should be appreciated that the difference between Historical Free Cash Flow and Future Free Cash Flow is that Historical Free Cash Flow is a known value of Free Cash Flow from a year that has completed, while Future Free Cash Flow is a calculated Free Cash Flow based on the Average Annual Growth Rate. It should be further appreciated that Equation (2) above may also be calculated in accordance with a longer form of the equation, i.e., EBIT=Revenue-Cost of Goods/Services-Expenses, and that both forms of the equation may be used interchangeably depending on the form of the data provided by the user. It should be yet further appreciated that Equation (8) is described as the average of three years of Annual Growth Rate data, however, it is within the scope of the present disclosure to calculate Equation (8) using two or more years of annual Growth Rate data, and that the numerator of Equation (8) is determined based on the number of years of data averaged. Moreover, it is also possible to calculate Equation (8) using estimated growth data. For example, if only a single year of Annual Growth Rate data is available, additional years of Annual Growth Rates can be estimated by a variety of means, e.g., industry data, reasonable assumptions, etc., and then used in Equation (8).

FIG. 1 depicts an embodiment of a present system for providing financial valuation of entities arranged in a conventional spreadsheet. As can be seen in FIG. 1, the various variables and calculated values set forth above in Tables 1 through 3, are arranged in spreadsheet 50, and include five (5) years of historical data, i.e., Years 2015-2019, and three (3) years of future or projected/predicted data, i.e., Years 2020-2022. As is more fully explained infra, user input is first obtained and then the calculated variables are determined in the order necessary. In other terms, some calculated variables require other calculated variables to be determined first in time as the subsequent calculated variables rely upon the values of the earlier calculated variables.

Spreadsheet 50 includes three (3) financial valuations for the example business shown as financial valuations 52, 54 and 56. Financial valuation 52 is the "highest" valuation as it is relies upon the lowest Discount Rate, financial valuation 54 is the "medium" valuation as it relies upon the middle Discount Rate, and financial valuation 56 is the "lowest" valuation as it relies upon the highest Discount Rate.

Figure 2:
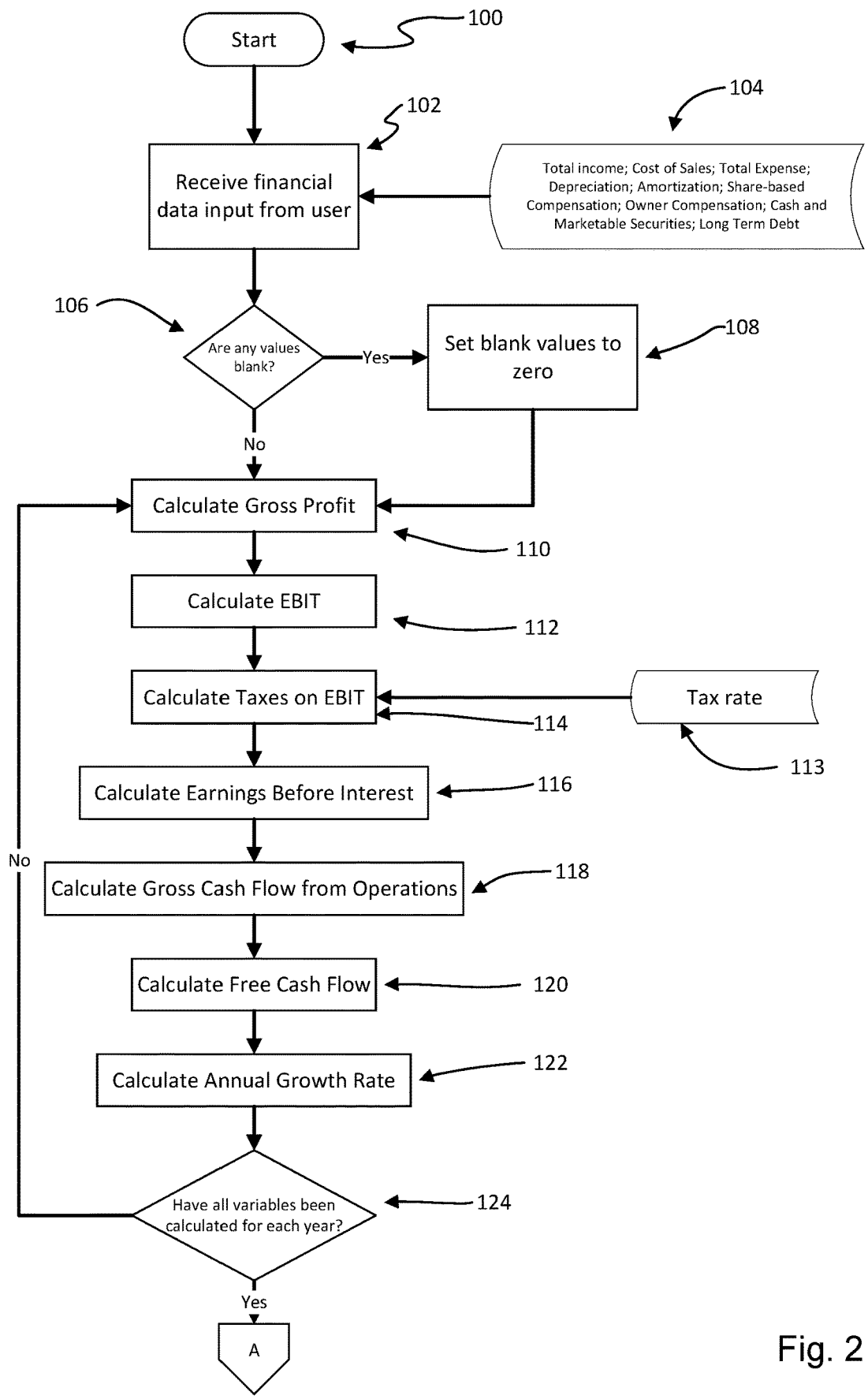
FIG. 2 is a first portion of a flow diagram of an embodiment of a present method for providing financial valuation of entities.
Figure 3:
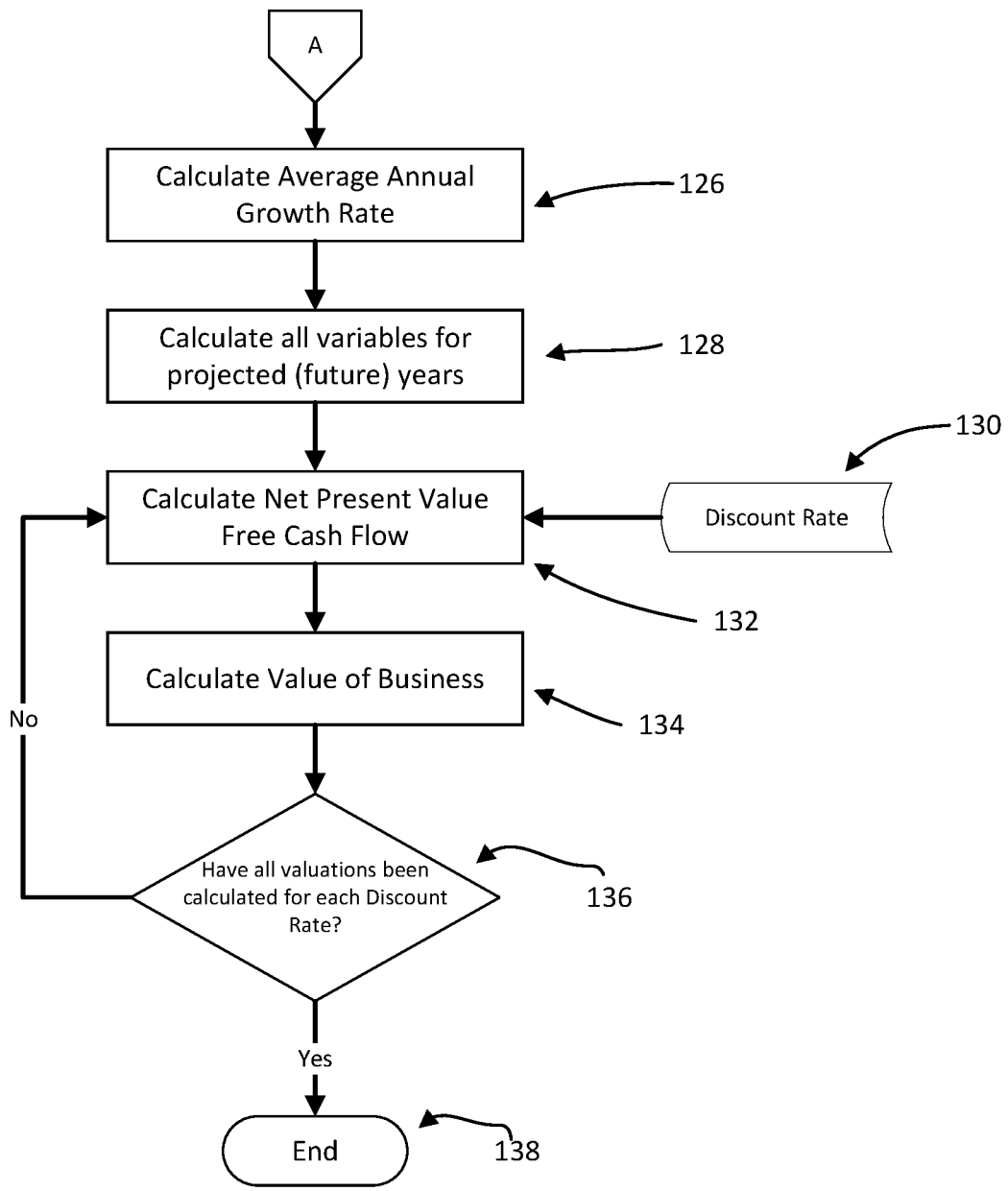
FIG. 3 is a second portion of the flow diagram of the embodiment of a present method for providing financial valuation of entities that begins in FIG. 2.
Figure 4:
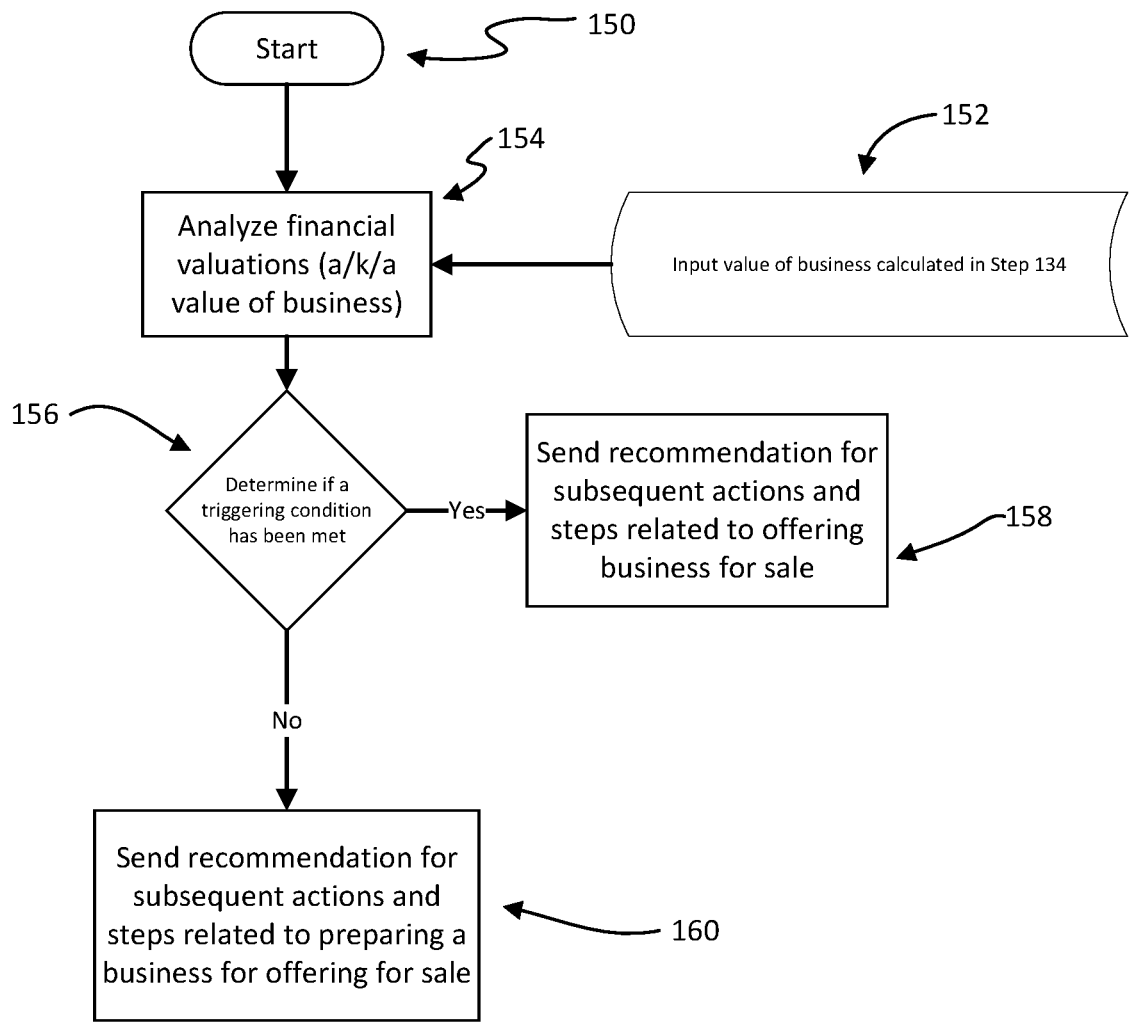
FIG. 4 is a third portion of the flow diagram of the embodiment of a present method for providing financial valuation of entities that begins in FIG. 2.

An embodiment of the present method is depicted in FIGS. 2, 3 and 4. It should be appreciated that the steps of the embodiment of the present method depicted in these figures can be performed in a different order, or steps may be skipped if certain information is already known, or unavailable. For example, if an Average Annual Growth Rate is known or can be assumed, a user would only need the most recent year's financial data in order to complete a financial valuation calculation. The user could rely upon the known or assumed Average Annual Growth Rate to extrapolate three or more years of future/predicted financial data and then use those predictions to complete the calculation of financial valuation of the business. However, it is believed that use of real historical data will provide a more accurate financial valuation, while permitting comparison to past performance to assess year to year consistency in business performance.

The embodiment depicted in FIGS. 2, 3 and 4 of the present method begins at Step 100. Financial data regarding a business is received from a user at Step 102. Relevant financial data may include but is not limited to: total income; cost of sales; total expense; depreciation; amortization; share-based compensation; owner compensation; cash and marketable securities; and long term debt. Such data may be received by direct input by a user, may be obtained from an accountant or accounting software, or it may be obtained from a data aggregator used to consolidate the business' financial and operational data in a single database of information. See Step 104. After the financial data is received, it is checked to determine if any data points are blank or empty at Step 106. If a data point is blank or empty, its value is set to zero at Step 108. Alternatively, if data points are found to be blank or empty, the present system can be configured to prompt the user to confirm that such data points are intended to be blank prior to setting blank data points to zero.

The following calculated variables are determined in accordance with the description of such variables included in Table 3 above. Gross Profit is calculated at Step 110, and next Earning Before Interest and Taxes (EBIT) is calculated at Step 112. After EBIT has been calculated in Step 112, a Tax Rate must be set at Step 113. The Tax Rate may be received from a user, may be preprogrammed within the source code, or may be obtained from an internal or external database. Subsequently, the Taxes on EBIT is calculated at Step 114, and then Earnings before Interest is calculated at Step 116. Next, Gross Cash Flow from Operations is calculated at Step 118, and then Free Cash Flow is calculated at Step 120. Last, an Annual Growth Rate is calculated at Step 122.

Depending on the number of years of financial data provided by a user or obtained from other sources, the foregoing process of calculating Gross Profit through Annual Growth Rate, i.e., Steps 110 through 122, may need to be repeated. At Step 124, a determination is made as to whether additional years of financial data must be analyzed. If additional years of financial data remain, Steps 110 through 122 are repeated for each respective year of data, otherwise, this embodiment of the present method progresses to Step 126.

Next, the average of the population of Annual Growth Rates is calculated at Step 126, and subsequently used to calculate predicted or future years' variables at Step 128. It should be appreciated that the Average Annual Growth Rate is used to calculate future values for both the variables provided by the user of the present method (or variables obtained from an accountant, accounting software, etc.) and the variables calculated from those provided values. It has been found that using the Average Annual Growth Rate to predict three to five years of future financial data results in accurate calculated financial valuations for a business. After future financial variables have been calculated in Step 128, a Discount Rate must be set at Step 130. As described above, the Discount Rate is selected based on the amount of risk in the financial valuation that is acceptable, e.g., the lower the Discount Rate, the higher the financial valuation. It has been found that a Discount Rate of fifteen percent (15%) yields a reasonable financial valuation, however, other Discount Rates may also be effectively used. The Discount Rate set in Step 130 is used to calculate the Net Present Value Free Cash Flow at Step 132. Next, the financial valuation of the business is calculated at Step 134, i.e., the value of the business is determined. If additional financial valuations at varying Discount Rates are desired, a determination of whether additional Discount Rates have been specified occurs at Step 136. If additional Discount Rates have been specified, Steps 132 through 134 are repeated for each Discount Rate, while if no additional Discount Rates have been specified, this portion of this embodiment of the present method completes at Step 138. It should be appreciated that varying Discount Rates may be specified by the user and/or may be previously selected and included within the calculations without intervention by the user. For example, the present system may include three pre-programmed Discount Rates and such Discount Rates may be used in Steps 132 through 134, or a user may change one or more Discount Rate, or may remove all but one Discount Rate.

It should be appreciated that subsequent to determining one or more financial valuations, some embodiments of the present system and method provide instruction based on the one or more valuations. For example, in some embodiments, the user provides a desired sale price for their business, and a timeframe within which they desire to complete such a sale. Through the various financial valuation calculations described herein, the calculated valuations from multiple future dates can be compared to the user's desired price and timeframe, and depending on which factor is more closely matched and when, the present system can indicate the optimal time to sell. Thus, if the user enters that they wish to sell their business for one million dollars in three years, and the calculated valuations show that in two years the valuation is one million dollars, the present system indicates that the user should sell its business in two years. Contrarily, given the same user entries, however in this instance the calculated valuations show that in three years the valuation will be seven hundred fifty thousand dollars and in four years the valuation will be one million dollars, the present system indicates that the user should sell its business in four years. Similarly, if the calculated valuations show a consistent decline, the present system may indicate that immediate sale is recommended, or if the calculated valuations show increases to a peak followed by declines, the present system may indicate the timeframe of the peak is the recommended sale date.

In like fashion, calculated valuations may be combined with other factors, e.g., historical business performance, financial insights, etc., to establish a business grade/score, such as a score from zero to one hundred. In some embodiments, financial insights may include but are not limited to, quick ratio, current ratio, cash ratio, net profit margin, return on assets, debt to equity, debt to asset, and return on equity. This combination can be performed in a variety of ways, e.g., a weighed average, a polynomial, or other known means of amalgamating or combining data, to establish the business score. For example, a business score may be calculated according the following equation:

$$\text{Valuation Growth} + \text{Financial Benchmarking} = \text{Business Score} \quad (12)$$

wherein a Valuation Growth of
    <−3%=20 points
    −3% to 0%=30 points
    >0% to 8%=40 points
    >8%=70 points, and
wherein a Financial Benchmarking of
    0-2 neutral or outperforming industry=20 points
    3-5 neutral or outperforming industry=30 points
    6 or more neutral or outperforming industry=50 points It should be appreciated that in the foregoing example, the lowest business score is forty (40) and although Equation (12) could result in a score of one hundred twenty (120), the business score in the foregoing example cannot exceed one hundred (100) points, i.e., the highest score is limited to one hundred (100) points.

Subsequently, the present system may provide recommendations based on the business score. For example, a business score of fifty or below may result in a recommendation of continued business growth or changes to business operations prior to entering into a sale, while a score of ninety or higher may result in a recommendation of immediate sale. It should be appreciated that the foregoing scores and recommendations are included as non-limiting examples only.

Moreover, some embodiments of the present system can make recommendations based on the calculated valuations and/or business score in combination with the data provided by the user or other means described supra. For example, if the business score is greater than seventy five, and profits are down despite revenues being up, the system may recommend the user reconsider their pricing in preparation to sell the business. Additionally, some embodiments of the present system may compare the trends observed within the calculated valuations against industry trends, and when the calculated valuation trends are more desirable than, or exceeding the industry trends, the present system may recommend an appropriate time for sale of the business.

In view of the foregoing, some embodiments of the present method include steps related to the analysis of the calculated financial valuations, and steps related to actions taken based on such analysis. The embodiment depicted in FIG. 4 of the present method begins at Step 150. However, it must be appreciated that the embodiment depicted in FIG. 4 is included as a non-limiting example of the analysis performed subsequent to the calculation of financial valuations, and actions taken subsequent to such analysis. The financial valuations calculated in in Step 134 (data input shown in element 152) are analyzed in Step 154 to determine whether subsequent steps should be triggered. The analysis performed in Step 154 may take a variety of forms, e.g., the forms described above. Then, based on the analysis performed in Step 154, a determination is made as to whether a triggering condition has been met in Step 156. For example, as described above, a business grade or score may be determined in Step 156. Next, that business score can be evaluated to determine whether it meets a threshold value, e.g., a business score of seventy five (75) or higher. It should be appreciated that the threshold value could be set by a user, established based on industry practices, etc. Provided the business score meets or exceeds the triggering condition, a subsequent action can be recommended or initiated at Step 158, e.g., offer to sell the business. Alternatively, should the analysis result in a determination that a triggering condition is not met, the present method may result in actions to be taken in contemplation of offering to sell the business in the future. For example, as described supra, if the business score is greater than seventy five (75), and profits are down despite revenues being up, the present system and method may recommend the user reconsider its pricing in preparation to sell the business. Such a recommendation may be made at Step 160, as depicted in FIG. 4. It should be appreciated that the foregoing example is only one example of a triggering condition being met, and that embodiments using metrics other than a business grade may result in a different determination at Step 156, which in turn may result in different subsequent actions or recommendations being made at Step 158.

Figure 5:
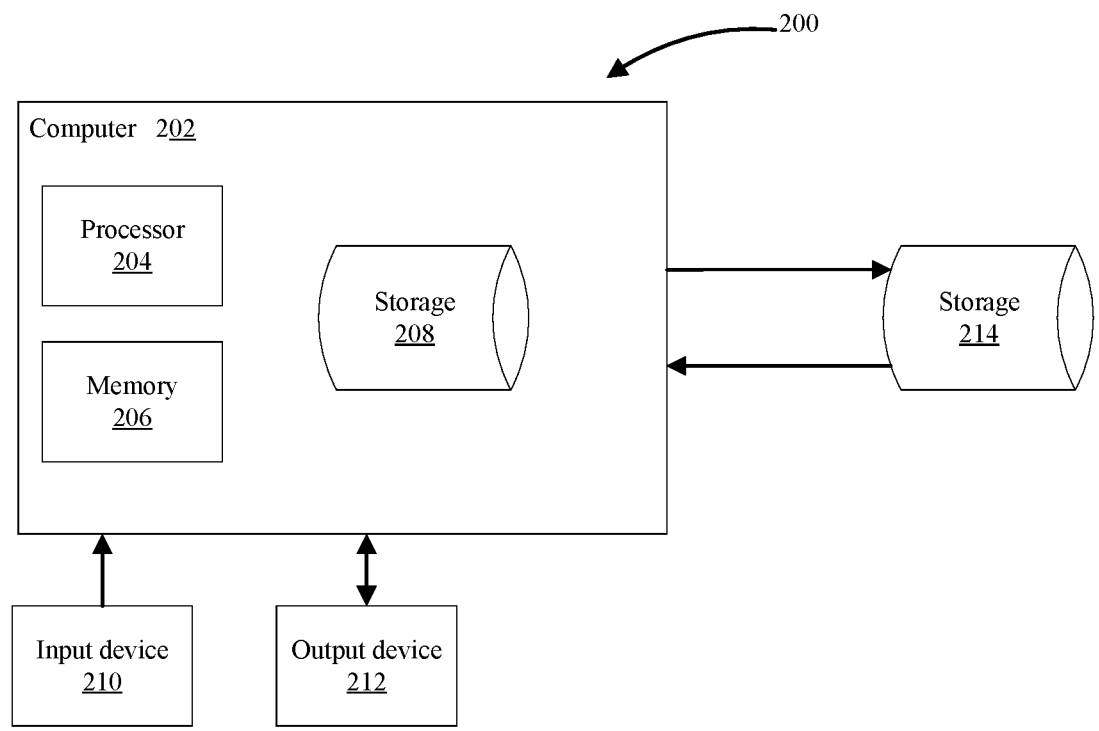
FIG. 5 is an embodiment of an apparatus for providing financial valuations of entities, and in some embodiments, the perfection of subsequent actions based on the valuation calculation.

Although the present methods may be performed using conventional computers, as described supra, FIG. 5 depicts system 200 which is arranged to perform embodiments of the present method. System 200 comprises computer 202, which includes but is not limited to, processor 204, memory 206 and storage 208. Computer 200 may include input device 210 and output device 212. Input device 210 may be a conventional computer input device such as a keyboard, a mouse, a touchpad, etc., while output device 212 may be a conventional computer output device such as a monitor, a printer, three-dimensional display, audio speakers, etc. In some embodiments, computer 202 is configured to communicate with storage 214. Storage 214 may be an external storage system, e.g., a cloud based database, or may be a second computer containing storage 214. It should be appreciated that in some embodiments, storage 208 may contain computer code operatively arranged to perform the steps of the present invention and/or may contain data or inputs from the user that are utilized in the present method to calculate financial valuations, to analyze financial valuations, to send instructions related to subsequent steps, etc., and storage 214 may be configured similarly as storage 208. In other terms, the present method may be executed on a computer associated with storage 214, e.g., a cloud based server, or may be executed on computer 202. In some embodiments, storage 214 is controlled by a financial institution, a data aggregator, or other supplier of inputs to the present system and method, while storage 208 is controlled by a user, or by computer code specially configured to perform the steps of the present methods. The abovementioned components of computer 202 are also described in further detail below.

It should be appreciated that the present system and method discussed herein can be formed by, used on or incorporate a data center, general purpose computers, or may be used on a computer that is specially configured for and limited to only use for the present system and method. In view of the foregoing, a more detailed discussion of the nature and type of computer components used by the present system and method, e.g., processor, memory, data storage, display, etc., is unnecessary as they are readily understood by one having ordinary skill in the art. Components such as processor 204, memory 206, and/or storage 208 that, in some embodiments, are responsible for performing steps such as Steps 102, 104, 106, 108, 110, 112, 113, 114, 116, 118, 120, 122, 124, 126, 128, 130, 132, 134, 136, 152, 154, 156, 158 and 160 in the presently disclosed methods may be a generally known component temporarily or permanently configured to perform the specific step or steps. Moreover, Steps 104, 113, 130 and 152 may result from data obtained from storage 214, which storage 214 may be configured to communicate with computer 202 using any means known in the art, e.g., via ethernet cable, WiFi, internet, etc. Additionally, Steps 104, 113, 130 and 152 may result from data obtained from input device 210, which input device 210 may be configured to communicate with computer 202 using any means known in the art, e.g., via wired connection, WiFi, Bluetooth®, etc. In view of the foregoing, it should be appreciated that Steps 104, 113, 130 and 152 are examples of receiving a set of user inputs, while Steps 113 and 130 are examples of receiving a set of fixed inputs. Still further, although anyone of the various steps may be displayed on output device 212, it should be appreciated that Steps 158 and 160 are examples of where the results of a particular step may be displayed on output device 212, which output device 212 is connected to computer 202 using any means known in the art, e.g., via wireless signal, high definition multimedia interface (HDMI®), super video graphics array (SVGA), etc. The term "processor" as used herein refers to one or more electronic circuits, devices, chips, processing cores and/or other components configured to process data and/or computer code. Non-transitory computer readable storage media may include but is not limited to: volatile and/or non-volatile memory; electrical, magnetic or optical storage means such as diskettes, magnetic tape, compact discs, and digital video discs; solid-state disk drives; and/or other non-transitory computer-readable media. In view of the foregoing, it should be appreciated that the present methods described herein may be embodied in the form of computer code and/or data which may be stored in non-transitory computer readable storage media, and a processor or computer system may read and execute that code. Thus, in those embodiments, the processor or computer system performs some or all of the present methods. It should be further appreciated that the present methods may also be stored in the form of computer executable code in hardware such as application-specific gate arrays (ASICs) and other devices known in the art.

It has been found that the present systems and methods minimize the need for business owners to have special knowledge in order to make an accurate determination of financial valuation of their businesses, when additional steps are necessary to prepare to offer a business for sale, and when is the optimal time to make such an offer. It can be performed using conventional computing systems, by a specially configured spreadsheet (e.g., as depicted in FIG. 1) or through common programming languages. The present method has been arranged to decrease needed processing capacity by selecting only those calculations needed to produce an accurate estimate of financial valuation of a business, i.e., optimizing the performance of the computer by minimizing processor demand.

The present systems and methods use a simplified version of the Discounted Cash Flow valuation method. The present systems and methods provide a business financial valuation range for the user, e.g., a business owner. When tested against other professional financial valuations, the present systems and methods were found to be reasonably accurate, i.e., on average within 10% of professional financial valuations. It has been found that using three to five years of historical data results in the present systems and methods provides an accurate financial valuation, however, as described supra, fewer than three years of historical data may be used to result in sufficiently accurate financial valuations.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What we claim is:

1. A method for determining a financial valuation for a business comprising:
   receiving a set of user inputs comprising at least one of the following: a total income, a cost of sales, a total expense, a depreciation, an amortization, a shared-based compensation, an owner compensation, a cash and marketable security, and a long term debt;
   receiving a set of fixed inputs comprising at least one of the following: a discount rate, and a tax rate;
   calculating at least one financial valuation using a modified discounted cash flow valuation method;
   determining when a trigger condition has been met based on the at least one financial valuation; and
   when the trigger condition has been met, sending a business owner a recommendation to take a subsequent action,
   wherein the step of calculating at least one financial valuation comprises the steps of:
      calculating a gross profit from at least one of the total income and the cost of sales;
      calculating an earnings before interest and taxes from at least one of the gross profit and the total expense;
      calculating a taxes from at least one of the earnings before interest and taxes and the tax rate;
      calculating an earnings before interest from at least one of the earnings before interest and taxes and the taxes;
      calculating a gross cash flow from operations from at least one of the earnings before interest, the depreciation, the amortization and the share-based compensation;
      calculating a historical free cash flow from at least one of the gross cash flow from operations and the owner compensation;
      calculating an annual growth rate from the historical free flow;
      repeating each of the steps from calculating the gross profit through calculating the annual growth rate for each year of data from the set of user inputs and the set of fixed inputs;
      calculating an average annual growth rate from the annual growth rate calculated for each year;
      calculating a future free cash flow from at least one of the historical free cash flow and the average annual growth rate;
      calculating a net present value free cash flow from at least one of the future free cash flow and the discount rate; and
      calculating the at least one financial valuation from at least one of the net present value free cash flow from at least one of the net present value free cash flow, the cash and marketable securities, and the long term debt.

2. The method of claim 1 wherein the set of user inputs is received from the business owner.

3. The method of claim 1 wherein the set of user inputs is received from a storage device.

4. The method of claim 1 wherein the set of fixed inputs is received from the business owner.

5. The method of claim 1 wherein the set of fixed inputs is received from a storage device.

6. The method of claim 1 wherein the step of determining when a trigger condition has been met comprises the steps of:
   calculating a business score based on a valuation growth and a financial benchmark; and
   comparing the business score to a threshold.

7. The method of claim 6 wherein when the business score is greater than the threshold value, the trigger condition has been met and the step of sending the business owner a recommendation is performed.

8. The method of claim 1 wherein the recommendation comprises at least one of: a recommendation to immediately sell the business; a recommendation to sell the business at a predetermined future time; and a recommendation to alter a characteristic of the business prior to selling the business.

* * * * *